(12) United States Patent
Krueger et al.

(10) Patent No.: US 10,182,250 B2
(45) Date of Patent: Jan. 15, 2019

(54) MANAGEMENT OF BROADCAST CONTENT

(75) Inventors: Craig Krueger, Fort Lee, NJ (US); Steven Peter Spencer, Livingston, NJ (US)

(73) Assignee: Fancaster, Inc., Fort Lee, NJ (US)

( * ) Notice: Subject to any disclaimer, the term of this patent is extended or adjusted under 35 U.S.C. 154(b) by 909 days.

(21) Appl. No.: 13/150,960

(22) Filed: Jun. 1, 2011

(65) Prior Publication Data

US 2012/0150991 A1 Jun. 14, 2012

Related U.S. Application Data

(60) Provisional application No. 61/423,090, filed on Dec. 14, 2010.

(51) Int. Cl.

| H04N 21/242 | (2011.01) |
| H04N 21/2665 | (2011.01) |
| H04N 21/81 | (2011.01) |
| H04N 21/84 | (2011.01) |
| H04N 21/414 | (2011.01) |
| H04N 21/431 | (2011.01) |
| H04N 21/442 | (2011.01) |
| H04N 21/658 | (2011.01) |
| H04N 21/4223 | (2011.01) |
| H04N 21/4788 | (2011.01) |

(52) U.S. Cl.
CPC ....... *H04N 21/242* (2013.01); *H04N 21/2665* (2013.01); *H04N 21/41407* (2013.01); *H04N 21/4223* (2013.01); *H04N 21/4312* (2013.01); *H04N 21/4316* (2013.01); *H04N 21/44218* (2013.01); *H04N 21/4788* (2013.01); *H04N 21/6582* (2013.01); *H04N 21/812* (2013.01); *H04N 21/84* (2013.01)

(58) Field of Classification Search
CPC .................... H04N 21/242; H04N 21/2665
USPC ......................................................... 709/217
See application file for complete search history.

(56) References Cited

U.S. PATENT DOCUMENTS

| 8,359,622 | B1 * | 1/2013 | Everson et al. | 725/114 |
| 2003/0215010 | A1 * | 11/2003 | Kashiwa | 375/240.02 |
| 2006/0139463 | A1 * | 6/2006 | Heinonen | 348/239 |
| 2009/0092374 | A1 * | 4/2009 | Kulas | 386/95 |
| 2011/0320627 | A1 * | 12/2011 | Landow et al. | 709/231 |

* cited by examiner

*Primary Examiner* — Derrick W Ferris
*Assistant Examiner* — Farhad Ali
(74) *Attorney, Agent, or Firm* — Blank Rome LLP

(57) ABSTRACT

A computer-implemented multimedia broadcast platform provides multimedia content to one or more users that allows users to dynamically send, receive, and modify content data associated with the multimedia broadcast platform. An embodiment of the present invention provides a computer-implemented method for receiving event identification information, receiving second content information, processing the second content information in real time, and outputting combined content. In one example, the second content information includes multimedia commentary related to the received event identification information. Another embodiment of the present invention provides a computer-implemented method for transmitting event identification information, processing second content information, and transmitting generated content information based at least in part on the second content information.

17 Claims, 7 Drawing Sheets

MANAGEMENT OF BROADCAST CONTENT

CROSS-REFERENCE TO RELATED PATENT APPLICATIONS

This non-provisional application claims priority to U.S. Provisional Application No. 61/423,090, filed Dec. 14, 2010, entitled MANAGEMENT OF BROADCAST CONTENT, the entirety of which is incorporated herein by reference.

BACKGROUND OF THE INVENTION

The present invention relates generally to the presentation and recording of multimedia content.

SUMMARY OF THE INVENTION

An embodiment of a computer-implemented multimedia broadcast platform provides multimedia content to one or more users that allows users to dynamically send, receive, and modify content data associated with the multimedia broadcast platform. In another embodiment, the multimedia broadcast platform broadcasts user-modified content that may be associated with one or more events. In one embodiment, the user-modified content comprises user-generated audio or video content that is associated with one or more content selections stored and provided by the multimedia broadcast platform. In one example, the user-generated content may be commentary regarding the provided content such that the user-modified content includes a plurality of related audio-video streams presented synchronously.

In another embodiment, the multimedia broadcast platform aggregates content to provide a promotion platform for advertising or marketing. For example, similar content associated with one or more events may be provided to one or more users. Users may provide feedback, such as voting or ratings related to the content, or may provide additional user-generated content based on the content provided by the multimedia broadcast platform.

One embodiment of the present invention provides a computer-implemented method for receiving event identification information, receiving second content information, processing the second content information in real time, and outputting combined content. In one example, the second content information comprises multimedia commentary related to the received event identification information. In another example, the combined content comprises the processed second content information.

According to another feature of the present invention, combined content may comprise at least two side-by-side content displays. According to another feature of the present invention, the computer-implemented method may comprise transmitting first video content information. According to another feature, processing second content information comprises synchronizing the first content information with second content information and generating combined content. In one example, combined content comprises a plurality of content streams associated with first content information and second content information.

According to another feature of the present invention, event identification information comprises a request for stored content. According to another feature, event identification information comprises location information. According to another feature of the present invention, first video content comprises user-generated video content. Another feature of the present invention provides for classifying received second content information based at least in part on received promotional information.

Another embodiment of the present invention provides a computer-implemented method for transmitting event identification information, processing second content information, and transmitting generated content information based at least in part on the second content information. In one example, second content information includes multimedia commentary related to the transmitted event identification information.

Another feature of the present invention provides for receiving first content information. In one example, receiving first content information comprises recording at least one of audio data or video or image data. In another example, processing comprises recording audio data and at least one of video data or image data using a second camera as the second content information. According to another feature of the present invention, processing comprises synchronizing first content information and second content information in real time. According to another feature, receiving first content information comprises receiving video data from at least one device. In one example, generated content information is based at least in part on first content information. In another example, event identification information comprises at least one of a location or event name. In another example, event identification information comprises at least one of promotional or sponsored event information.

Another feature of the present invention provides for selecting at least one available content item for sharing via at least one social networking platform. In one example, a computer comprises a mobile device. In another example, recording comprises capturing a live event in real time using a first camera.

Another embodiment of the present invention comprises a server device including a memory and processor configured to receive event identification information, receive content information, process second content information in real time, and output combined content. Another embodiment of the present invention comprises a device including a memory and processor configured to transmit event identification information, process second content information, and transmit generated content information based at least in part on second content information.

Other aspects and features of the present invention will become apparent to those of ordinary skill in the art upon review of the following description of specific embodiments of the invention together with the accompanying figures.

DETAILED DESCRIPTION OF THE PREFERRED EMBODIMENTS

Figure 1:
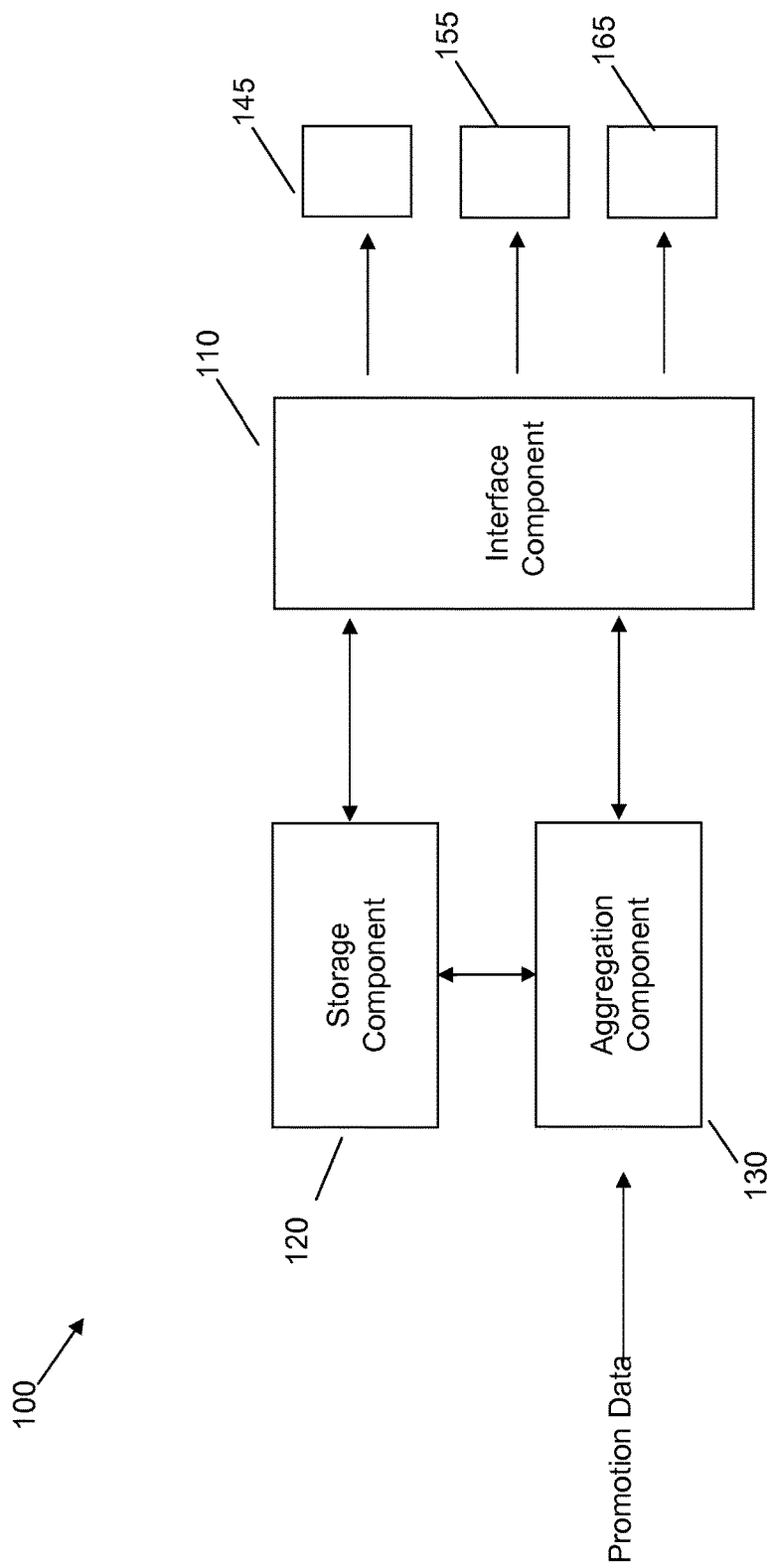
FIG. 1 is a block diagram overview of an exemplary embodiment of the present invention.

In the following description, numerous specific details are set forth to provide a thorough understanding of the present invention. However, it will be clear to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skill of persons of ordinary skill in the relevant art.

Referring now to the drawings, depicted elements are not necessarily shown to scale, and like and similar elements are designated by the same reference numeral through the several drawings.

FIG. 1 illustrates exemplary components of a multimedia broadcast platform 100, such as an interface component 110, a storage component 120, and an aggregation component 130. As shown in FIG. 1, in one embodiment multimedia broadcast platform 100 is configured to communicate with one or more user devices, such as devices 145, 155, and 165, which may be computing devices such as desktop computers, laptop computers, handheld devices, including smart phones, tablets, and the like, or other devices that may be configured to communicate with multimedia broadcast platform 100 via a computer network such as the Internet or wireless communication networks. It is to be understood that in certain embodiments, various components of multimedia broadcast platform 100 may be embodied on various computer-readable media of computing devices, such as a server device or a user device, to facilitate communication via a computer network.

In one embodiment, interface component 110 is operatively coupled to and configured to communicate with storage component 120 and aggregation component 130 to send and receive content associated with requests from one or more users. Interface component 110 may be configured to provide an interface through which one or more users may interact with multimedia broadcast platform 100. In one embodiment, interface component 110 may be configured to provide one or more representations of content associated with media broadcast platform 100 via a computer network, such as the Internet. For example, interface component 110 may provide content in a HyperText Markup Language (HTML) or other forms that allow content to be provided to one or more users using an Internet browser application, as well understood in the art. The content may also include dynamic content provided using scripting and other technologies for displaying multimedia content encoded using various technologies and methods such as Adobe Flash and H.264 that allow audio or video content to be displayed within an Internet browser. One of skill in the art will recognize that such enumerated technologies are merely exemplary and are not intended to limit the scope of the encoding and reproduction technologies that are available to present content via computing applications such as Internet browsers.

In one embodiment, interface component 110 is configured to receive audio-video content from the storage component 120 and the aggregation component 130. In an exemplary embodiment, multimedia content may be presented by interface component 110 as part of a web-page interface that is accessible via the Internet. In another embodiment, interface component 110 is configured to receive content from at least one user using at least one device. For example, the at least one user may access a web-page based interface that is configured to communicate using at least one device associated with at least one user to send and receive multimedia content. In another embodiment, multimedia content may be communicated to and from at least one device of the at least one user via a computer application configured to execute on the at least one device.

In one embodiment, storage component 120 is operatively coupled to and is configured to communicate with interface component 110, and aggregation component 130. As will be discussed in greater detail below, storage component 120 may be configured to communicate with at least one multimedia database using Structured Query Language (SQL) to facilitate storage of multimedia data in a relational database. In another embodiment, storage component 120 may be configured to communicate using at least one programming language or query language with a non-relational database. For example, multimedia database may be implemented as an object-oriented relational database such as MySQL or PostgreSQL, a non-relational database such as MongoDB, or some combination thereof. One having ordinary skill in the art will understand that the specific database implementations listed are merely exemplary and that other implementations are possible.

Further, storage component 120 may be configured to communicate with and store multimedia data in one or more database storage structures, as discussed below. Storage component 120 may communicate with such databases to efficiently store and retrieve multimedia data associated with one or more requests or queries from interface component 110 or aggregation component 130. For example, storage component 120 may provide a relational storage structure used to facilitate searching of a database if the database is implemented as a non-relational database. To facilitate access to multimedia data requested by interface component 110 or aggregation component 130, storage component 120 may be configured to perform a lookup operation in a relational table before querying a database for corresponding multimedia data.

In one embodiment, aggregation component 130 may be operatively coupled and configured to communicate with interface component 110 and storage component 120. Aggregation component 130 may be further configured to receive promotional or advertising data, which identifies certain multimedia content or content types. In one embodiment, aggregation component 130 is configured to receive promotional data that identifies a specific type of media content that should be retrieved using storage component 120 to be distributed via interface component 110 to one or more users. In one embodiment, the type of media content specified by promotional data may include sports content, current events, entertainment, or other content accessible via multimedia broadcast platform 100. In another embodiment, promotional data may include advertising information that allows for the placement of advertisements or collection of advertising data based on content delivered via multimedia broadcast platform 100. For example, advertising data may include content streams configured to deliver advertising content that corresponds to multimedia content delivered via multimedia broadcast platform 100. In one embodiment, such advertising data may include demographic information, content type, historical information, or other information configured to select one or more advertisements related at least one of the content or the user. Information related to identified content or promotional data may be provided to interface component 110, in one embodiment, to facilitate generation of a graphical user interface presented to one or more users.

Figure 2:
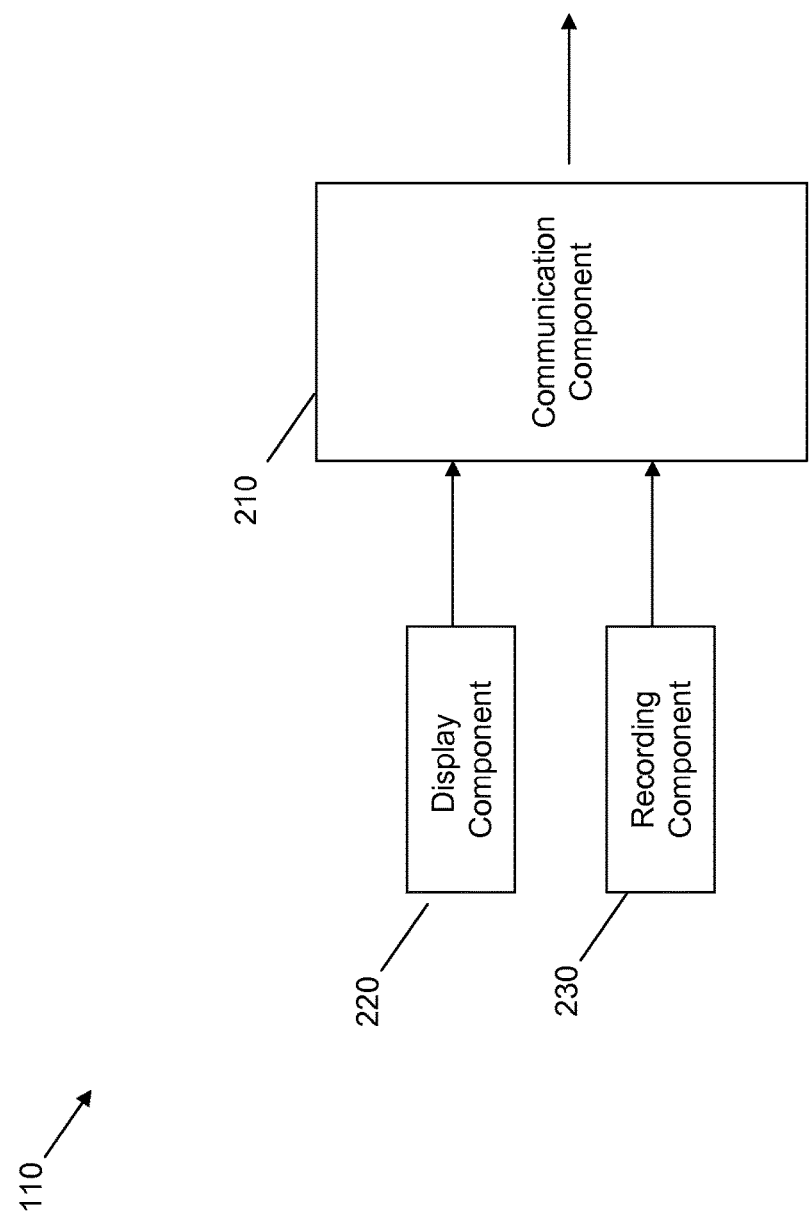
FIG. 2 is a block diagram illustrating an Interface Component according to an embodiment of the present invention.

FIG. 2 provides a more detailed view of an embodiment of interface component 110. In an exemplary embodiment, interface component 110 comprises a communication component 210, display component 220, and a recording component 230. Communication component 210 may be configured to communicate with at least one user via a computer network, such as the Internet, display component 220, and recording component 230. In an exemplary embodiment, communication component 210 is configured to provide and receive content data via the Internet as part of an HTML-encoded web page to at least one user. The content data may be configured to correspond to a device associated with the at least one users, such that a display of the content via an Internet browser application is optimized for the device associated with the user. In one embodiment, communication component 210 is configured to transmit data received from playback component 220 via the computer network to at least one user. For example, communication component may be configured to transmit Flash-encoded video data embedded in an HTML-encoded web page to at least one user device.

In another embodiment, communication component 210 is configured to transmit and receive data to and from the at least one user. Data received may include requests for content stored by multimedia broadcast platform 100, user-generated content, or commercially generated content. In one embodiment, communication component 210 is configured to receive processed multimedia content that corresponds to content previously provided to at least one user. The processed content may include user-generated content, such as commentary or rating information associated with content stored by multimedia broadcast platform 100. In another embodiment, communication component 210 is configured to send and receive unprocessed content data that may be provided to recording component 230 for further processing.

In another embodiment, communication component 210 is configured to receive identification information associated with at least one user. For example, communication component 210 may receive information regarding events, such as geographic information, building location, title information, or other information to facilitate identification of a user or event. In another embodiment, communication component 210 may be configured to determine location information based at least in part on user-supplied information or information associated with a computing device to facilitate identification of content.

Display component 220 may be configured to provide content to at least one user. In one embodiment, display component 220 provides a graphical user interface configured to be displayed by an Internet browser application associated with at least one user. For example, display component 220 may provide a HTML-based layout that contains at least one representation of available content that the at least one use may access using hyperlinks embedded in the graphical user interface. The representations may also include indications of ratings associated with the content or comments related to the content. In another embodiment, display component 220 may include representations of content that facilitate integration of such content with Internet-based social media websites and services, such as Facebook and Twitter. In another embodiment, the graphical user interface provided by display component may be optimized to present representations of available content in a format specific to the device associated with the at least one user. In one example, display component 220 may provide a first representation of content if a first user accesses the provided interface via a computing device configured to execute a particular Internet browser application, such as Internet Explorer, Apple Safari, Google Chrome, or Mozilla Firefox, or a specific computing application configured for the specific computing device. In an embodiment, the computing application may be an application configured to execute on a specific type of mobile device, and display component 220 may provide a specific representation of content for that application.

In one embodiment, display component 220 determines the representation of content based on at least one content format associated with individual content items displayed as part of the interface. In one example, display component 220 may provide a representation associated with content that is only available in a non-Flash encoding format because a computing device associated with at least one user is not configured to display content in the Flash format. In another example, display component may provide one or more representations of available content, such that the at least one user may select the desired format for the content based on, for example, connection speed or computing device capabilities.

In another embodiment, display component 220 is configured to provide playback of content associated with multimedia broadcast platform 100. In one example, the content may include user-generated content received by display component 220 via communication component 210 that may be subsequently played back for one or more users in response to a request for content. More specifically, display component 220 may facilitate the play back of user-generated content as one video stream within a graphical user interface, where the content is dynamically modified to alter the content. In one example, the content associated with multimedia broadcast platform 100 may be dynamically modified to remove audio data or adjust display characteristics to facilitate playback with other content. In another embodiment, display component 220 is configured to provide multimedia content with associated advertising or promotional data for display to at least one user. In one example, display component 220 may be configured to provide at least one multimedia content window within a graphical user interface to display multimedia content provided by multimedia platform 100.

In another embodiment, at least one window within the graphical user interface may be configured to provide a real-time display of input from at least one user using the graphical user interface. More specifically, display component 220 may be configured to display input from one or more input devices such as image or video recording devices and audio recording devices operatively coupled to the user's device. For example, the graphical user interface provided by display component 220 may include input from such recording devices along with location or associated information regarding the user's current geographic or physical whereabouts. Such information may include mapping information, event information, news information, or promotional materials related to the user's location and associated with the content being recorded. In another embodiment, the graphical user interface is configured to provide at least one other display window within the graphical user interface. Such other window may be configured to display additional content, such as other user-generated content, content provided by multimedia platform 100, or promotional material with which the content being recorded may be associated, synchronized, or linked to.

Another embodiment of display component 220 includes a graphical user interface configured to provide at least two content windows corresponding to input from two or more recording devices configured to record content in real time. In one example, two recording devices may include two camera components of a mobile computing device configured to record multimedia data. In one embodiment, the graphical user interface may display user-generated content data from two recording devices in real time as both content streams are received and recorded by the computing device.

Recording component 230 may be configured to receive and process audio or video content data. In an exemplary embodiment, recording component 230 is configured to receive at least one content data stream and to process the content data stream for subsequent playback or retrieval via multimedia broadcast platform 100. For example, recording component 230 may be configured to receive input from a recording device associated with a computing device, such as a mobile phone that includes one or more video recording devices. In one embodiment, recording component 230 is configured to receive a content stream from a video recording device and may process the content stream in real time to generate an encoded data stream. One having ordinary skill in the art will recognize that multiple encoding and/or compression techniques are possible, and it is to be understood that this disclosure is not intended to be limited to a single such technique. In another embodiment, recording component 230 may be configured to receive a content data stream from a recording device and may store or transmit in real time the content data without further processing. For example, recording component 230 may receive an uncompressed data stream from a recording device and may transmit the uncompressed data to other components of multimedia broadcast platform 100 operatively coupled to the recording component 230 in real time. In another example, recording component 230 may store the uncompressed data in a volatile or non-volatile memory as recording component 230 receives the data.

In another embodiment, recording component 230 may be configured to receive a plurality of content streams simultaneously from one or more recording devices associated with one or more recording devices. For example, recording component 230 may receive two content streams from a single computing device configured to include two recording devices, such as two cameras. More specifically, the single computing device may include frontward-facing and rearward-facing cameras that may simultaneously record content. In another example, recording component 230 may receive concurrent content streams from two or more computing devices. The two devices may, for example, include mobile devices where one device is configured to record an event and the second device is configured to record the user's commentary regarding the event.

Figure 3:
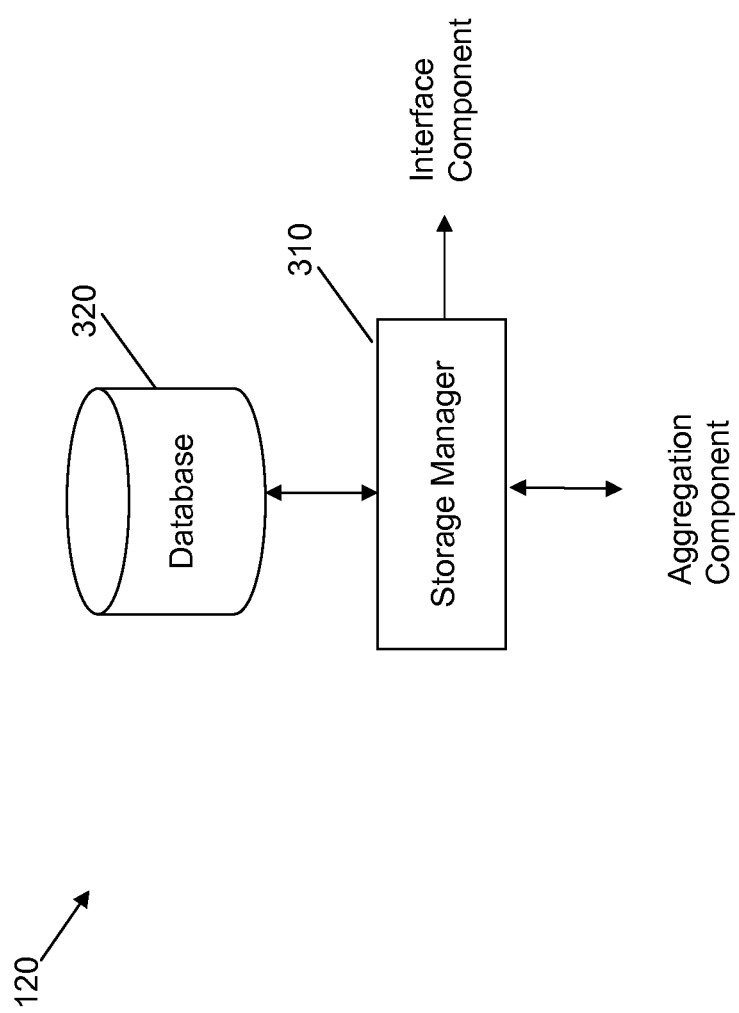
FIG. 3 is a block diagram illustrating a Storage Component according to an embodiment of the present invention.

FIG. 3 is a block diagram of a more detailed view of an embodiment of storage component 120. In an exemplary embodiment, storage component 120 includes a storage manager 310 and a database 320 configured to store content data. In one example, database 320 may be replaced with several database structures configured to store content in connection with the operation of multimedia broadcast platform 100. Although reference will be made to database 320 herein, it is to be understood that the reference to database 320 is not intended to be limiting and may refer to a number of database storage structures operatively connected to the multimedia broadcast platform 100.

Storage manager 310 may be configured to transmit and receive data to and from other components of multimedia broadcast platform 100 to facilitate access to multimedia content. In one embodiment, storage manager 310 is configured to receive and classify multimedia content to facilitate storage in at least one database, such as database 320. As discussed previously, storage manager 310 may be configured to interact with one or more databases using SQL or other programmatic query languages to facilitate access to data. For example, storage manager 310 may be configured to interact with a MySQL database using SQL to store or retrieve data. In another example, storage manager 310 may be configured to interact with a non-relational database using a programming or query language.

In another embodiment, storage manager 310 may be configured to provide references between objects stored in the at least one database, such as database 320. For example, storage manager 310 may be configured to provide a reference between a stored multimedia recording and a user-generated multimedia recording that contains commentary related to the stored content. A stored recording may be multimedia content retrieved by multimedia broadcast platform 100 via a communications network from another database or may represent user-generated content previously received and stored by the multimedia broadcast platform 100. More specifically, the recordings may be stored as table entries in a database, such as database 320, and may include references to other related database objects within the table entries to facilitate access to related content stored in the database.

In one embodiment, originally stored content may be stored differently than commentary-type content generated by one or more users. As discussed previously, various database storage components, such as database 320, may be configured to provide relational or non-relational storage. In one example, one type of content may be stored in a relational database, and the other type of content may be stored in a relational database. Further, the content stored in the relational database may be configured to contain a reference to the content stored in the non-relational database to facilitate access to the content.

In another embodiment, the two pieces of content may be stored as a single database object to facilitate access to the first content and the second content. Each content item may be stored distinctly as, for example, first content and second content, but the content items may be stored together as a database object in, for example, database 320.

Figure 4:
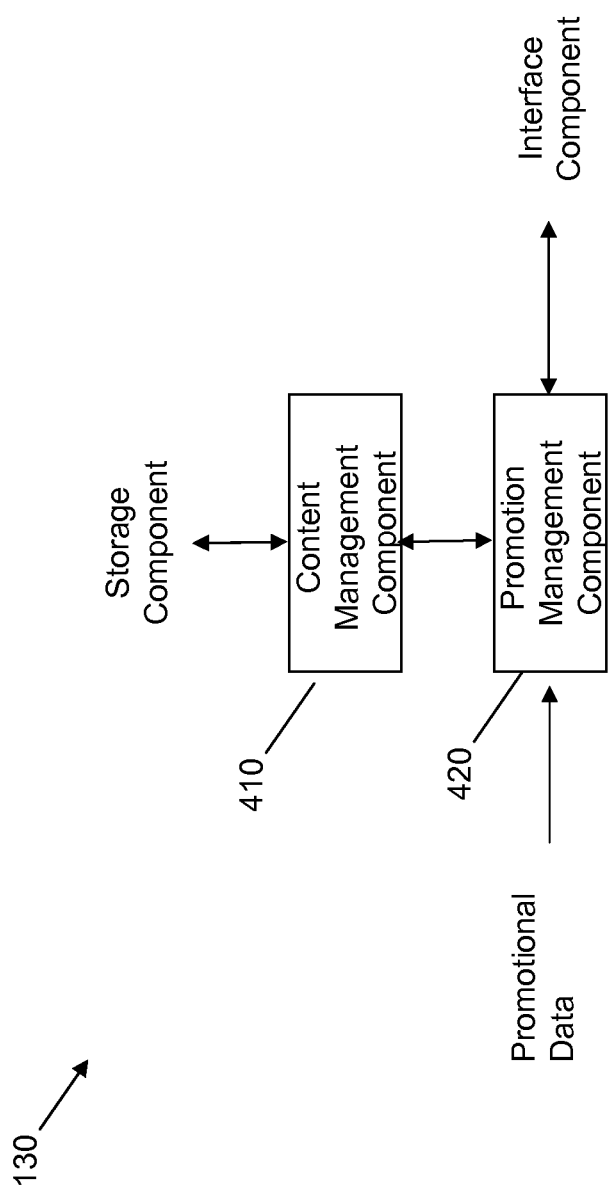
FIG. 4 is a block diagram showing an Aggregation Component according to an embodiment of the present invention

FIG. 4 is a block diagram of an embodiment of aggregation component 130. In an exemplary embodiment, aggregation component 130 includes a content management component 410 and a promotion management component 420. Content management component 410 may be configured to identify and receive stored content that may be related to a specific advertising or promotional opportunity based on information received from promotion management component 420. Promotion management component 420 may be configured to receive input from one or more users to identify promotional, advertising, or marketing opportunities that may be facilitated by multimedia broadcast platform 100.

In one embodiment, content management component 410 may be configured to communicate with storage component 120 and interface component 110 to identify content that may be provided to one or more users accessing multimedia broadcast platform 100 via a communications network and an interface provided by interface component 110. For example, content management component 410 may use identified keywords or content attributes to identify stored content that may be relevant to a marketing opportunity. More specifically, content management component 410 may be configured to identify content matching attributes such as content type, media type, date, user name, or other features associated with content to determine whether the content is relevant to one or more promotional opportunities. If one or more content entries is determined to be relevant, content management component 410 may be configured to provide the one or more content entries to, for example, interface component 110 as individual or a group of content to be presented to one or more users.

In another embodiment, content management component 410 may be configured to receive rating or other feedback information regarding content provided via multimedia broadcast platform 100. Content management component 410 may use content identified as relevant to a particular promotion, contest, or marketing opportunity and evaluate rating information or feedback from one or more users to determine which content item has the highest rating. For example, content management component 410 may be configured to determine which content item related to particular promotion has received the highest "number of stars" from users who have viewed the content. As will be discussed in greater detail below, content management component 410 and promotion management component 420 may use the identified rating and associated content items to provide one or more users with prizes or other benefits based on the rating.

Promotion management component 420 may be configured to receive promotional or marketing information from one or more sources to facilitate contests or other promotional events. In one embodiment, contests or promotional events may relate to in-person events, such as concerts, sporting events, current or historical events, or broadcasts of certain events at particular locations, or may relate to online or broadcast content accessible by a user via a communications network, such as the Internet. For example, a promotional event may take place at a music concert where individuals can generate content that may be uploaded to and distributed by multimedia broadcast platform 100. In another example, a contest may be conducted by a regional chain of sports bars related to a sports tournament that the bars are broadcasting. In another example, the promotional event may be conducted online through a social media website or during a sports broadcast show on television that the user may watch. Other promotional events are contemplated as well.

In one embodiment, promotion management component 420 may receive information regarding one or more promotional events and may generate keywords or other search metrics that may be used to classify or identify content related to the promotional events. For example, if a promotion is related to the National Football League Super Bowl, promotion management component 420 may generate keywords such as "NFL," "Super Bowl," team names, the year, or the Super Bowl number to locate stored content and identify content generated in the future. More specifically, the keywords may be used to locate content from various content sources that may be used as part of the promotional event that may be related to the "Super Bowl" event. Such content may include, for example, highlights from one or more previous Super Bowl events.

In another embodiment, promotion management component 420 may be configured to receive information regarding one or more promotional prizes that are related to the promotional event. Such promotional prizes may be distributed to one or more user who participates in the promotional event if the user's content received a specified rating from users who viewed the content or received the highest rating of all content related to the event. For example, information received by promotion management component 420 related to a promotional event at a local sporting event may specify that the user having the highest rated content should receive an email message including a gift credit that may be used to purchase items at events at the stadium. The email including the gift credit may be communicated to the user using techniques well-known in the art for communicating using text-based messaging or via email over computer networks, such as the Internet.

Figure 5:
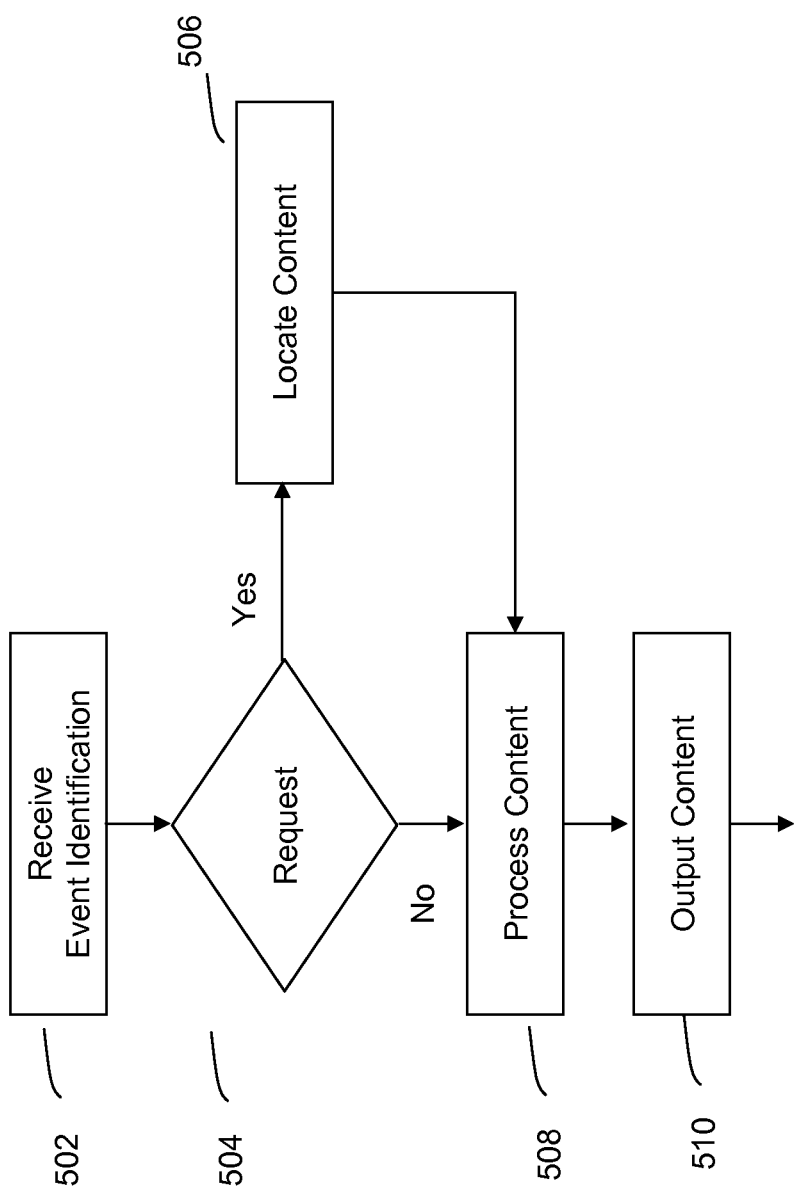
FIG. 5 is a flow diagram illustrating an embodiment of a process for providing and receiving multimedia content.

FIG. 5 shows a process associated with a server device according to an embodiment of the present invention. At step 502, a server device is configured to receive event identification information via a communications network. In one embodiment, the server device may be configured to receive the event identification information from a mobile device connected to the server device via the Internet or a wireless data network. In an embodiment, received event identification information may include location information associated with the user or event information. The event identification information, thus, may include geographic information, building information, event title information, business name information, or other types of information that may provide context for a user broadcast. In an embodiment, the event identification information also may be configured to include a request for content stored by or accessible to the server device, such as content available to the server device via the Internet.

At step 504, the server device is configured to determine whether the event identification information included a request for stored content. If yes, the process proceeds to step 506. If the event identification information did not include a request, the process proceeds to step 508.

At step 506, the server device attempts to locate content associated with the request included with the event identification information. If content associated with the request is located, the server device may transmit the content via the communications network.

At step 508, the server device is configured to process in real time or as a received data file content received via the communications network. In one embodiment, the server device may receive real time multimedia content from a mobile device configured to include audio and video recording devices. In another embodiment, the server device may receive synchronized, processed, or otherwise manipulated content as a data file from a computing device connected to the server device via a communications network.

Figure 6:
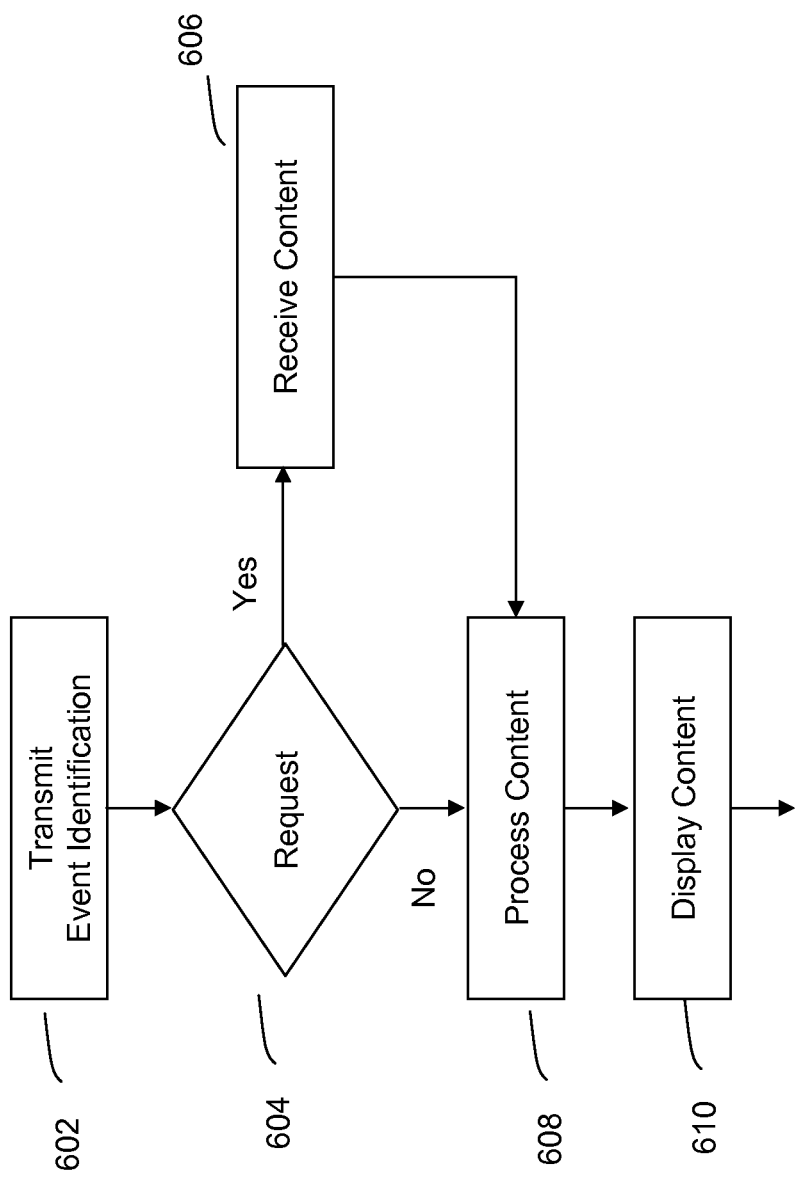
FIG. 6 is a flow diagram illustrating another embodiment of a process for providing and receiving multimedia content.

At step 510, the server device may be configured to output content data associated with the data received and processed at step 508. In one embodiment, the server device may be configured to output the content as part of a graphical user interface with other content. In another embodiment, the server device may be configured to output the content synchronized with data associated with an earlier request for stored content, such that the received content and the stored content may be displayed synchronously as part of a graphical user interface. FIG. 6 shows a process associated with a client device configured in accordance with an embodiment of the present invention. At step 602, the client device may transmit event identification information via a computer network or wireless network. As discussed previously, event identification may include location information associated with the user or event information. The event identification information, thus, may include geographic information, building information, event title information, business name information, or other types of information that may provide context for a user broadcast. In an embodiment, the event identification information also may be configured to include a request for content that is desired to be delivered to the client device. In one embodiment, the client device may be a mobile phone or computing device configured to communicate with at least one other computing device via at least one computer network.

At step 604, if the client device included a request for content with the event identification information or is configured to record video content using a first camera coupled to the client device, the process proceeds to step 606. If not, the process proceeds to step 608.

At step 606, the client device receives content information. In one embodiment, the content information may be video content configured to be displayed by the client device that is received via a computer network or wireless network based on a request for content. In another embodiment, the client device is configured to record content information using a first video recording device operatively coupled to the client device. For example, a client device such as a mobile phone may be configured to record video content using a first camera device built-in or operatively coupled to the phone. More specifically, the first camera device may be a camera physically located on the rearward side of the mobile phone configured to record content that the user is also able to see.

At step 608, the client device processes second content information. In one embodiment, the client device is configured to record audio and video content using recording devices coupled to the client device. For example, a client device such as a mobile phone may be configured to record audio content and video content using a second camera device and microphone built in or operatively coupled to the phone. More specifically, the second camera device may be a forward-facing camera oriented to capture an image or video of the user of the device. In another example, the second camera device may be a camera device operatively coupled to a desktop or notebook computing device that captures an image or video of the user of the device.

At step 610, the second content information may be displayed on the user device. In an embodiment, the second content information may be displayed in a side-by-side configuration within a graphical user interface displayed on the device. Each content stream may be displayed synchronously with the other content stream within the interface. For example, the graphical user interface may present the first content information on one side of the interface and the second content information on the other side of the display so that the content is synchronized. More particularly, where the second content information contains commentary related to the first content information, the content may be displayed synchronously so that the commentary is matched with the first content.

Figure 7:
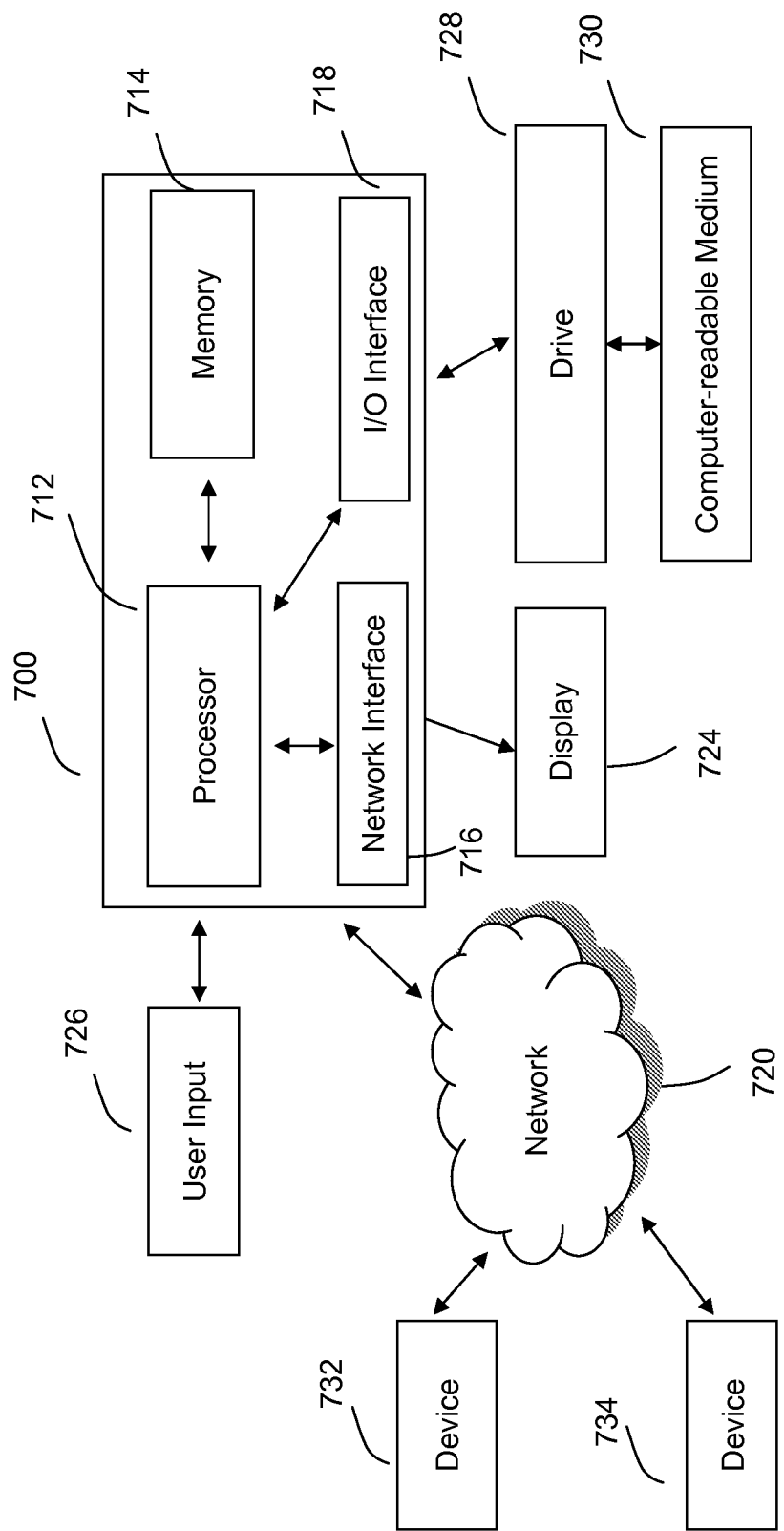
FIG. 7 is a block diagram of an exemplary networked computing environment.

A simplified hardware architecture of an example computing device 700 configured to implement an embodiment of the present invention is schematically illustrated in FIG. 7. Device 700 could, for example, be an Intel x86 based computer acting as a network server, workstation, personal computer or the like. Device 700 includes at least one processor 712, in communication directly or indirectly through a system bus (not shown) with computer storage memory 714, network interface 716, and input output (I/O) interface 718. Device 700 may optionally include a display 724 and user input device 726 or the like. Processor 712 is typically a conventional central processing unit and may be any suitable processor known to those skilled in the art. Computer storage memory 714 includes a suitable combination of random access memory (RAM), read-only-memory (ROM), and disk storage memory used by device 700 to store and execute software programs adapting device 700 to function in manners exemplary of the present invention. Drive 728 is capable of reading and writing data to or from a computer readable medium 730 used to store software and data to be loaded into memory 714. Computer readable medium 730 may be a Digital Versatile Disc (DVD), Compact Disc ROM (CD-ROM), Compact Disc Rewritable (CD-RW), diskette, tape, ROM-Cartridge or the like. Input/output devices, such as user input device 726, include but are not limited to keyboards, displays, pointing devices, etc. and can be coupled to the system either directly or through intervening I/O controllers or interfaces, such as I/O interface 718.

Network interface 716 is any interface suitable to physically link device 700 to network 720. Interface 716 may, for example, be an Ethernet or wireless interface that that may be used to pass data from and to network 20 or another suitable communications network. Network adapter 726 may also be coupled to the system to enable the device 700 to become coupled to other data processing systems or remote printers or storage devices through intervening private or public networks. Devices 732 and 734 may be other servers, workstations, personal computers, or other computing devices configured to communicate with device 700 via network 720. The hardware architectures of other computing devices, such as devices 732 and 734, are to be used by way of examples, individually or networked together, and are materially similar to that of device 700, and will therefore not be further detailed.

The flowchart and block diagrams in the figures illustrate the architecture, functionality, and operation of some possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

In one example, a user interacting with an embodiment of the present invention configured to operate on a mobile device may communicate, via a computer network, such as the Internet or a wireless data network, with another embodiment of the present invention configured to operate on an Internet server. In this example, the user may transmit information, such as the context of what the user is doing—such as location information, the event the user is attending, the sports game the user is watching, or additional contextual information—via the computer network.

The user also may generate content using one or more recording devices operatively connected to or contained in the mobile device of the user, such as camera devices and audio-recording devices. The recorded content may be video content that captures the user, audio content, video content that captures what the user is currently viewing, or some combination thereof. The recorded content, for example, may capture audio or video content the user describing certain aspects of a sports event, such the final seconds of a basketball playoff victory that is being broadcast on a display device for the user or that the user is watching in person. The recorded content also may capture the event itself, including video and audio content, using recording devices operatively connected to or contained in the mobile device of the user.

Recorded content may be streamed in real time via the computer network from the mobile device or may be processed by the mobile device to generate processed, user-generated content, which also may be transmitted by the mobile device via the communications network.

If the contextual information provided indicates that the user is participating in a promotional event or contest, the generated content may be associated with such events automatically. The user also may indicate that certain content items should be shared via one or more social networking platforms accessible via the computer network or should be associated with one or more promotional events by selecting the content items using the mobile device.

What is claimed is:

1. A computer-implemented method, comprising:
   receiving at an interface component of a mobile device, first content information from a first camera built-in on the mobile device on a forward-facing side of the mobile device, wherein the first content information comprises a first audio/video content information of an event;
   receiving at the interface component of the mobile device, second content information from a second camera built-in on the mobile device on a rearward-facing side of the mobile device, wherein the second content information comprises a second audio/video content information of the event, and wherein the second content information is received simultaneously with the first content information;
   synchronizing the first content information with the second content information; and
   generating combined content, wherein the combined content comprises the synchronized first content information and second content information.

2. The computer-implemented method of claim 1, further comprising displaying the combined content by simultaneously displaying the combined content on two side-by-side content displays by displaying the first content information on a first content display side and simultaneously and synchronously displaying the second content information on a second content display side.

3. The computer-implemented method of claim 1, wherein the first event content information includes event identification information comprising a request for stored content.

4. The computer-implemented method of claim 1, wherein the first event content information includes event identification information comprising location information.

5. The computer-implemented method of claim 1, wherein the first content information comprises user-generated content.

6. The computer-implemented method of claim 1, further comprising classifying the received second content information based at least in part on received promotional information.

7. The computer-implemented method of claim 1, further comprising displaying the combined content on a display by displaying the first content information on a first content display and simultaneously and synchronously displaying the second content information on a second content display.

8. A computer-implemented method, comprising:
   transmitting from an interface component of a mobile device, first content information, wherein the first content information comprises a first audio/video content information recording of an event by a first camera built-in on the mobile device on a forward-facing side of the mobile device;
   transmitting from the interface component of the mobile device, second content information, wherein the second content information comprises a second audio/video content information from a second camera built-in on the mobile device on a rearward-facing side of the mobile device, wherein the first content information is generated simultaneous with the second content information;
   synchronizing the first content information with the second content information;
   generating combined content, wherein the combined content comprises the synchronized first content information and second content information; and
   transmitting the combined content.

9. The computer-implemented method of claim 8, further comprising receiving the first content information.

10. The computer-implemented method of claim 9, wherein receiving the first content information comprises receiving video data from at least one device.

11. The computer-implemented method of claim 8, wherein the first content information is recorded using the first camera and the second content information is recorded using the second camera.

12. The computer-implemented method of claim 8, wherein the first content information includes event identification information comprising at least one of a location or event name.

13. The computer-implemented method of claim 8, wherein the first content information includes event identification information comprising at least one of promotional or sponsored event information.

14. The computer-implemented method of claim 8, further comprising selecting at least one available content item for sharing via at least one social networking platform.

15. The computer-implemented method of claim 8, wherein the computer comprises a mobile device, and wherein the first content information recording further comprises capturing a live event in real time using a first camera.

16. A server device, comprising:
a memory configured to store first content data comprising a first audio/video content information recording of a first event from a first camera built-in on a forward-facing side of a mobile device; and
a processor operatively coupled to the memory and configured to:
receive the first content data;
receive second content data, wherein the second content data comprises a second audio/video commentary content data recording of a second event from a second camera built in on a rearward-facing side of the mobile device that is opposite the forward-facing side of the mobile device, wherein the first content data is simultaneously generated with the second content data;
synchronize the first content data with the second content data to provide combined content; and
output the combined content, wherein the first content data is simultaneously and synchronously output with the second content data.

17. A mobile device, comprising:
a memory at said mobile device, the memory configured to store content data; and
a processor at said mobile device, the processor operatively coupled to the memory and configured to:
transmit first content information, wherein the first content information comprises a first audio/video content information recording of an event from a first camera built-in on a forward-facing side of a-said mobile device;
process second content information, wherein the second content information comprises a second audio/video content information recording of the event from a second camera built-in on a rearward-facing side of said mobile device, wherein the second content information is simultaneously generated with the first content information;
synchronize the first content information with the second content information:
generate combined content, wherein the combined content comprises the synchronized first content information and second content information; and
transmit the combined content for display by displaying the first content information on a first content display area of a display device and simultaneously and synchronously displaying the second content information on a second content display area of a display device.

* * * * *